Sept. 28, 1965 E. A. EDWARDS ETAL 3,208,686
FILM CARTRIDGE
Filed Dec. 30, 1963 2 Sheets-Sheet 1

THEODORE A. MUNSON
EVAN A. EDWARDS
JOHN A. BLACK
INVENTORS

BY
ATTORNEYS

Sept. 28, 1965

E. A. EDWARDS ETAL 3,208,686

FILM CARTRIDGE

Filed Dec. 30, 1963

THEODORE A. MUNSON
EVAN A. EDWARDS
JOHN A. BLACK
INVENTORS

BY *R. Frank Smith*

*Karl T. Haramony*
ATTORNEYS

# United States Patent Office 3,208,686
Patented Sept. 28, 1965

3,208,686
FILM CARTRIDGE
Evan A. Edwards and Theodore A. Munson, Rochester, and John A. Black, Fairport, N.Y., assignors to Eastman Kodak Company, Rochester, N.Y., a corporation of New Jersey
Filed Dec. 30, 1963, Ser. No. 334,207
13 Claims. (Cl. 242—71.2)

This invention relates to a motion picture film cartridge, and more particularly to a motion picture film cartridge of the type having a supply and a take-up chamber disposed in coaxial relationship.

Motion picture film cartridges for cinematographic apparatus are well known in the art and are generally loaded with film having perforations along at least one edge. Prior to being exposed, the film in such a magazine is coiled within a supply chamber with its leading end guided past an exposure aperture and attached to a take-up core in a take-up chamber located coaxially relative to the supply chamber. When a loaded cartridge is in proper position in a cinematographic apparatus, a film advancing claw in the apparatus projects through the exposure aperture of the cartridge to engage the perforations in the film and intermittently pull it from the supply roll, while a take-up drive in the apparatus is operatively coupled to the take-up core of the cartridge. For effective use, it is best that the outside dimensions of the cartridge be kept to a minimum such that a user can easily handle it for insertion into, and withdrawal from, its operable position within the cinematographic apparatus.

Since it is desirable to design the cartridge to have minimum outside dimensions, it thus becomes desirable to reduce the length of the path that the film travels within the housing when it moves from the supply chamber to the coaxially located take-up chamber. However, when the length of this path is thus reduced there is a tendency for the intermittent action of the film advancing claw, in moving film past the exposure aperture, to be transmitted to, and to adversely affect the movement of film from the supply chamber to the exposure aperture, and from the exposure aperture to the take-up chamber. As a result, the film often buckles and jams within the film cartridge to bind against the walls of the passageways through which it travels, thereby causing unsteady registration of the film at the exposure aperture and erratic apparatus and cartridge operation.

An object of this invention is to provide a film cartridge for cinematographic apparatus with improved film guiding, film tensioning and film controlling elements for moving the film from a supply chamber to a take-up chamber coaxial with said supply chamber.

Another object of this invention is to provide a film cartridge for cinematographic apparatus which will permit the film to be readily moved from a supply chamber to a coaxial take-up chamber without causing erratic operation of either the apparatus or the cartridge.

Other objects and a fuller understanding of the invention can be had by referring to the following description and claims taken in conjunction with the accompanying drawings in which:

Figure 1:
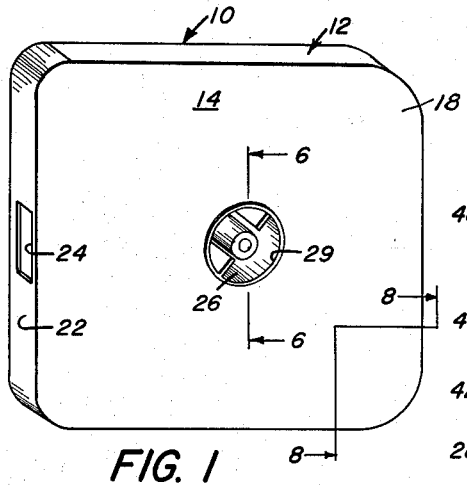
FIG. 1 is a perspective view of a loaded film cartridge constructed in accordance with a preferred embodiment of our invention.

In order to better understand the operation and construction of the apparatus, a brief summary of the invention will be helpful. The box-like housing of a film cartridge is divided by a partition to provide a supply chamber and a take-up chamber in side by side relation relative to one another. A perforated, spirally coiled filmstrip or film, coiled in a given sense, is rotatably mounted in the supply chamber on a centrally disposed cylindrical boss. The filmstrip is tangentially unwound from the coil and moves towards the rear wall of the housing where means are located for reversing the path of the filmstrip such that the filmstrip is bowed in a sense opposite to that in which it is coiled, and then, is directed towards the front wall of the housing. In moving towards the front wall of the housing, means are provided for preventing the filmstrip from engaging the walls of the housing and for guiding the filmstrip in a patch which is canted relative to the plane of rotation of the film coiled in the supply chamber to cross over the partition and into alignment with the take-up chamber. Adjacent the upper portion of the front wall of the housing, a suitable snubber engages a flat surface of the film such that its path is directed downwardly, past an exposure aperture located in the front wall of the housing, to a second snubber which directs the film towards the rear wall of the housing. Means adjacent the film path as it moves from the second snubber prevents the film from buckling and jamming as it moves towards the rear wall. Spaced adjacent the rear wall, stationary means are provided for reversing the direction of movement of the filmstrip such that it is bowed in a sense opposite to that in which it is coiled in the supply chamber and for centering the path of the filmstrip. A suitable take-up core in the take-up chamber winds the filmstrip thereupon about an axis which is substantially coaxial to the axis of the coil of filmstrip in the supply chamber. By means of this structure, the film coiled in the supply and take-up chambers is isolated from the intermittent action of the film advancing claw which isolation results in improved film registration at the exposure aperture and a smooth movement of the film along its path.

Referring more particularly to FIGS. 1–6, the film cartridge 10 comprises a generally U-shaped body 12 and a matching U-shaped cover 14. A continuous edge wall 16 embracing three sides of body 12, cooperates with the side walls 18 and 20 and front wall 22, respectively, of cover 14, such that body 12 and cover 14 by virtue of their assembly, form a substantially light-tight housing. When cartridge 10 is properly loaded into cinematographic apparatus (not shown) an exposure aperture 24 in front wall 22 will be positioned in alignment with a lens system (not shown) of the apparatus and the hub 26 of the take-up core 27 will be drivingly engaged with a drive member (not shown) of the cinematographic apparatus.

Figure 2:
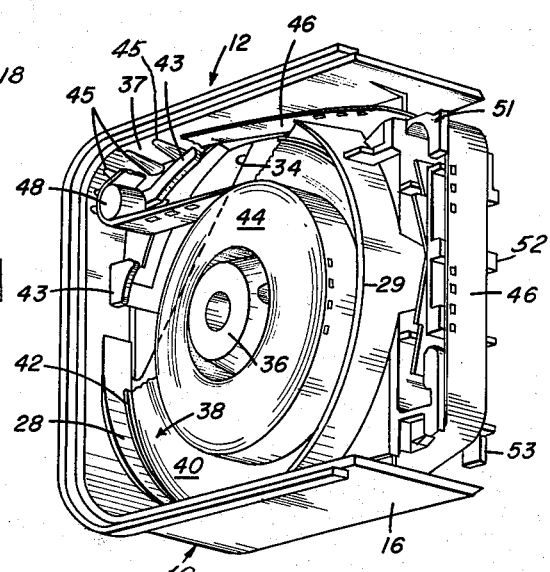
FIG. 2 is a perspective view of the body of the loaded film cartridge of FIG. 1 looking at the supply side and with certain parts broken away to better show the construction.
Figure 3:
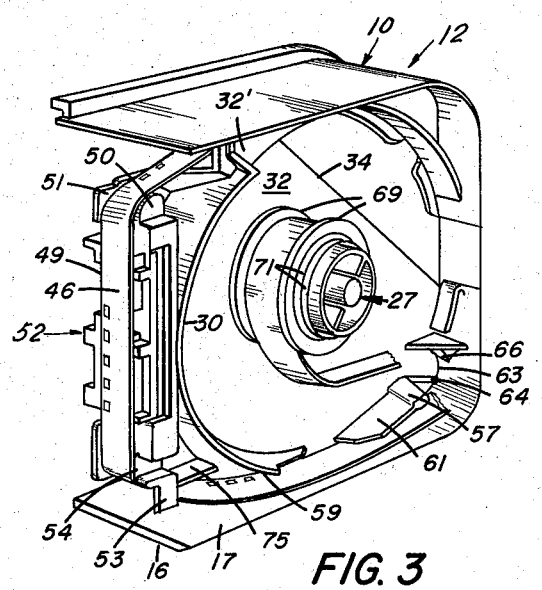
FIG. 3 is a perspective view of the body of the loaded film cartridge looking at the take-up side.

As best shown in FIGS. 2 and 3, body 12 includes a generally cylindrical supply chamber 28 and a generally cylindrical take-up chamber 30 formed on opposite sides of the body and substantially in coaxial alignment with each other. A common wall or partition 32, which has a segmental opening 34, forms the bottom of both the supply chamber 28 and the take-up chamber 30. A continuous wall 29, forms the peripheral side wall of that portion of supply chamber 28 that does not overlie opening 34. A conical locating boss 36 is formed on partition 32 substantially at its center and projects into supply chamber 28.

As best shown in FIG. 2, a flexible, annular antifriction disk 38 having an outside diameter slightly less than the diameter of cylindrical supply chamber 28 and an inside diameter slightly greater than the diameter of boss 36, is coaxially positioned on boss 36 and is mounted for rotation thereabout in a plane substantially perpendicular to the axis of boss 36. The outer periphery of disk 38 is formed to provide a lip 42 surrounding its flat trap portion 40 such that a segment of the flat tray portion 40 including the lip 42 will overlie and be in registry with opening 34. A pair of lugs 43, located adjacent to the arc forming one side of segment opening 34, project towards the center of supply chamber 28 and overlie lip 42 of disk 38 to restrict movement of that portion of disk 38 in registry with opening 34 in a direction such that disk 38 can only be deflected into opening 34. A snubber 48, which is preferably rotatable, is mounted on body 12 adjacent the curved interior surface 37 of edge wall 16 and substantially at the center of the arc forming one side of segment opening 34.

Figure 5:
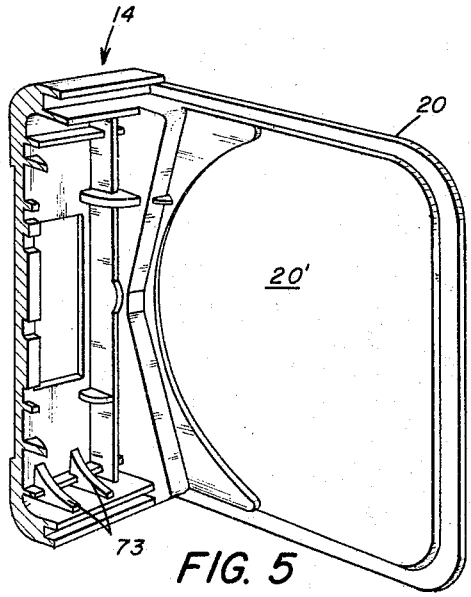
FIG. 5 is a perspective view partially in section of the front wall and side wall of the cover that encloses the body of the film cartridge.

A coreless coil or roll 44 of film strip or film 46 is placed in supply chamber 28, coaxial to boss 36, such that its innermost spirally wound edge lies against the flat tray 40 of antifriction disk 38, and its outermost spirally wound edge lies in a plane substantially parallel to the surface 20' of wall 20 of the cover 14 (see FIG. 5). By means of this structure the spirally wound convolutions of the coil are prevented from being displaced axially of the roll relative to one another by an amount which might cause jamming of the filmstrip within supply chamber 28. The lip 42 of disk 38 overlaps the marginal portion of the outer convolution of the coiled film 44 and prevents the outer flat surface thereof from slidably engaging the peripheral wall 29 supply chamber 28.

A plurality of spaced ribs 45 protrude from curved surface 37 adjacent snubber 48 and extend lengthwise on the surface substantially parallel to the axis of rotation of coil 44 and snubber 48 to limit the radial displacement and reduce friction between filmstrip 46 and curved surface 37 as filmstrip 46 moves about snubber 48, as will be further described hereinbelow. The filmstrip 46, as it is tangentially unwound from roll 44 and moved towards snubber 48, will exit from chamber 28 in a path which will be in registry with opening 34 regardless of whether it is being unwound from a full roll of film or from a substantially empty roll of film. Filmstrip 46 is sufficiently rigid in an edgewise direction that as it is withdrawn along its path, its edge wall will ride over lip 42 of disk 38 and deflect that portion of the disk in registry with opening 34 out of its normal plane and into the opening. Filmstrip 46 is guided from the supply chamber 28 about the snubber 48, being curved thereabout in the direction whose sense is opposite to the sense in which the filmstrip is coiled in roll 44. It is then guided across the top of body 12 in a passageway, formed by wall 20 of the cover, the inner surface of edge wall 16 and wall 32' (see FIG. 3) of body 12, canted with respect to partition 32, such that the path of the film is offset out of the plane of rotation of coil 44 in supply chamber 28 and crosses over into alignment with take-up chamber 30.

As viewed in FIGS. 2 and 3, filmstrip 46 then passes over an upper stationary snubber 50 and across a spring biased pressure pad 52 to a lower stationary snubber 54. Upper snubber 50 includes a guide surface 51, formed on that end of snubber 50 adjacent supply chamber 28, for slidably engaging edge 49 of filmstrip 46 to edge guide the same. Because of the resilient characteristics of filmstrip, which characteristics tend to retain the filmstrip in alignment with coil 44, edge 49 of filmstrip 46 will tend to constantly slidably engage guide surface 51, thus providing one reference point for restricting lateral movement of the film as it moves downwardly across pressure pad 52. Similarly, guide surface 53 located on lower snubber 54 provides a second reference point for edge guiding the filmstrip 46 in proper position relative to pressure pad 52. When the cartridge is in operative position in a cinematographic apparatus, a pair of additional side guides (not shown) of the appaartus will engage opposing edges of filmstrip 46 adjacent aperture 24 to prevent any lateral movement thereof. Thus guide surfaces 51 and 53 provide reference points for maintaining filmstrip 46 in a given position prior to alignment with the side guides of the apparatus.

Figure 7:
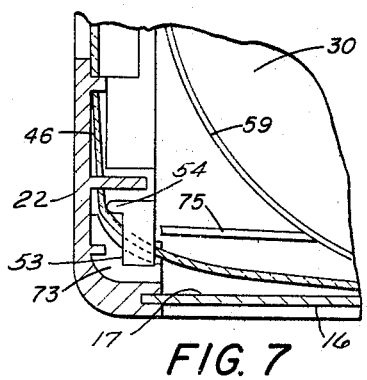
FIG. 7 is a partial detail view of the assembled film cartridge shown in FIG. 1 with the cover partially broken away to show the interior arrangement.
Figure 8:
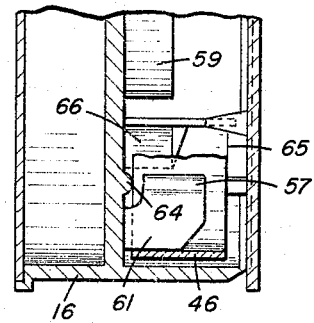
FIG. 8 is a detail cross sectional view of an assembled film cartridge taken substantially along the line 8—8 of FIG. 1.

As best shown in FIGS. 5 and 7, when cover 14 is assembled onto the body 12, a pair of film guide tracks 73 in the lower portion of the front wall 22 of the cover are positioned adjacent the film path. As filmstrip 46 moves around snubber 54; guide tracks 73 will direct the filmstrip 46 being advanced from the pressure pad 52 towards the take-up chamber 30, such that the film is prevented from buckling in the corner of the cover. The tracks are so spaced with respect to each other that they will engage the marginal portions of the filmstrip as it is being advanced and will not contact the central image bearing portion of the filmstrip.

Figure 4:
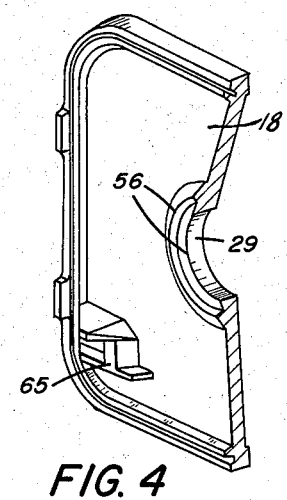
FIG. 4 is a perspective view partially in section of the side wall of the cover that encloses the take-up side of the film cartridge.

As best shown in FIGS. 3 and 7, after filmstrip 46 passes over lower snubber 54, it moves towards the rear portion of the body in a path which is spaced from and substantially parallel to the inner surface 17 of edge wall 16. A film guide wall 75 projects perpendicularly outwardly from the surface of partition 32 and extends substantially parallel to the bottom edge wall 16 of body 12 for the purpose of preventing filmstrip 46 from buckling as it moves from snubber 54 towards another stationary snubber 57, located at one end of the lower portion 61 of the peripheral side wall 59 of the take-up chamber. The filmstrip is then reversely curved through opening 63 provided adjacent snuber 57. A film guide bead 64 is formed on partition 32 and extends from snubber 57 towards the inner surface of edge wall 16. A curved film guide 66 is located adjacent to bead 64 for the purpose of providing a rounded corner to direct film movement through opening 63 for the purpose of preventing buckling of the film as it moves around snubber 57. As best shown in FIGS. 3 and 4, side wall 20 of cover 14 includes a corner film guide 65, which, when the cover is in place, will cooperate with bead 64 to engage opposite edges of filmstrip 46 and center the filmstrip relative to take-up chamber 30 as it moves around snubber 57.

Figure 6:
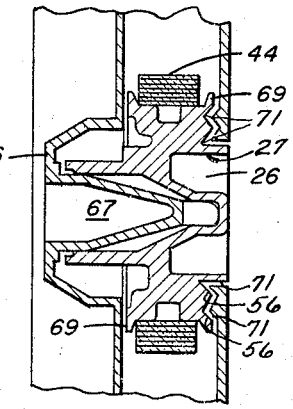
FIG. 6 is a fragmentary cross sectional view of an assembled film cartridge taken substantially along the line 6—6 of FIG. 1.

As best shown in FIGS. 3, 4, and 6, the cylindrical take-up core 27 is centrally disposed within take-up chamber 30 and is journaled on a stud 67 which is formed as a part of boss 36. Take-up core 27 will wind successive convolutions of film 46 thereupon and is provided with flanges 69 which will initially center the film thereon cooperatively with the bead 64 and the corner guide 66 to further insure freedom from lateral film wander and a level wind-up, free of contact between the film and the cartridge walls. When cover 14 is assembled onto body 12, take-up core 27 is aligned with circular opening 29 of the cover (see FIG. 1) so that the drive member (not shown) of the cinematographic apparatus can be drivingly coupled to the hub 26 of core 27 when the cartridge is loaded into the apparatus. A plurality of grooves 71 in the end of the core 27 cooperate with a plurality of concentric ridges 56 located adjacent the opening 29 in side wall 18 so that a suitable light lock is provided around the opening.

To better understand the operation of the invention as shown in FIGS. 1–8, it will be necessary to assume that cartridge 10 is initially loaded into cinematographic apparatus such that a pulldown claw and drive member (not shown) are operatively coupled to the film cartridge for the purpose of moving film from the supply chamber 28 to take-up chamber 30, past the exposure aperture 24 in the front wall 22 of cover 14. As the filmstrip 46 is intermittently pulled from roll 44 in supply chamber 28, by the pulldown claw, the roll 44 will rotate about its axis on boss 36. Under these conditions that segmental portion of disk 38 which is in registry with opening 34 will be deflected by the edge of filmstrip 46 into the opening thereby permitting the film to be tangentially withdrawn from the roll and along its path about rotatable snubber 48. Because film coiled in a roll will tend to "set," after a period of time, filmstrip 46, as it is unwound, will tend to curve in the same given direction or sense in which it is wound in the supply chamber. Thus, as filmstrip 46 moves about snubber 48, the radius of curvature of the filmstrip will tend to be greater than the radius of curvature of the rotatable snubber, resulting in the outer surface of that portion of the filmstrip 46 passing about snubber 48 tending to intermittently and somewhat erratically slidably engage the curved surface 37 of edge wall 16. However, the tips of spaced ribs 45 will prevent such erratic operation by engaging the filmstrip 46 and limiting the radial outward displacement of the film as it passes about snubber 48 to a value such as to obtain a smooth and relatively constant friction entry into the passageway leading to the upper snubber 50. As filmstrip 46 moves over upper snubber 50, edge guide 51 will slidably engage edge 49 of filmstrip 46, to guide the filmstrip in a straight path across pressure pad 52. As filmstrip 46 moves over the lower snubber 54, film guide tracks 73 in cover 14 will smoothly guide the filmstrip towards the rear stationary snubber and will prevent buckling of the filmstrip caused by the intermittent motion imparted to the film at the exposure aperture and the substantially continuous winding movement of the take-up core to wind film thereupon. In addition, film guide wall 75 will also prevent the film from buckling and jamming into the area between the take-up chamber wall 59 and the rear portion of snubber 54, due to the same differences in motion of the filmstrip. The film traverses the bottom of the cartridge between the surface 17 of edge wall 16 and the portion 61 of take-up chamber wall 59 to reach and round the rear snubber 57. Film guide 66 directs the film in a smooth curve around the snubber and toward the take-up core to insure the maximum practical wrap about snubber 57. Film guidance in this area is necessary to prevent looping of the incoming film between the film wound on the core and the inner surface of wall 59 of take-up chamber 30. As the film moves around snubber 57, lateral control of the film is obtained by the cooperation of film guide bead 64 on body 12 and the corner film guide 65 of cover 14. In moving around snubber 57, the film is centered relative to the beveled flanges 69 on take-up core 27 to further insure freedom from lateral film wander and a level wind-up free of contact between the film and the cartridge walls.

The purpose of the rotatable snubber 48 and stationary snubber 57, is in effect to isolate the portions of the film at the supply coil, the take-up roll and at the exposure aperture from one another to compensate for the different types of movement imparted to the filmstrip in these three areas. For example, without snubber 57, the constantly driven take-up core tends to pull film directly through the exposure aperture when the film claw is removed from the film perforations at the end of a pull down stroke. By reason of the snubbers 48 and 57 being located at the rear of the cartridge in spaced relation to snubbers 51 and 54 a long flow path is provided in advance of and beyond the exposure aperture whereby the reaches of film between the exposure aperture and the supply and take-up rolls are allowed to assume a slightly curved or bowed configuration allowing the film to resiliently flex which also tends to compensate for the different types of motion to which the different portions of the filmstrip is subjected in its travel. Ribs 45, track guides 73 and guide wall 75 control the film as it moves from supply chamber 28 to take-up chamber 30 to prevent the resiliency thus gained from introducing troublesome film looping and lateral wandering of the filmstrip. This effect results in improved performance of operation of a coaxial film cartridge such that jamming due to film buckling and binding against the cartridge walls has been substantially eliminated and registration of the filmstrip in the exposure aperture has been improved.

The invention has been described in detail with particular reference to an embodiment thereof, but it will be understood that variations and modifications can be effected within the spirit and scope of the invention as described hereinabove and as defined in the appended claims.

We claim:

1. In a motion picture film cartridge which includes a housing having a front wall provided with an exposure aperture across which a film is adapted to be intermittently moved for exposure and a rear wall, a partition located within said housing substantially perpendicular to the plane of each of said front and rear walls to separate the interior of said housing into a supply chamber and a take-up chamber, means in said supply chamber for rotatably supporting a coil of film so that it can be withdrawn therefrom and guided past said exposure aperture, means for rotatably mounting a take-up core in said take-up chamber in substantially coaxial relation with said coil of film located in said supply chamber for winding up the film fed into said take-up chamber, the improvement comprising:

a plurality of guide means within said housing defining a path of travel for the film in which the film extends substantially tangentially from the upper side of said coil rearwardly of said housing where it is doubled back upon itself and directed along the top portion of said housing and toward the front wall thereof in a path which is canted relative to the plane of rotation of said coil of film and crosses over said partition into alignment with the plane of rotation of said take-up core and thence downwardly across said exposure aperture and then rearwardly of the housing below said take-up core to a location behind the axis of said take-up core where the film is again doubled back upon itself and directed forwardly of the housing and onto the take-up core, said plurality of guide means including
 (1) first guide means adjacent the upper rear portion of said housing and behind said supply coil of film around which first guide means the film is doubled back upon itself and directed toward the front wall of the housing,
 (2) second guide means for directing the film from said first guide means forwardly of said housing and in canted relation to the plane of rotation of said coil of film, and
 (3) third guide means located at the lower rear portion of said housing about which third guide means said film after leaving the exposure aperture is doubled back upon itself and is redirected forwardly of said housing and onto said take-up core.

2. A motion picture film cartridge according to claim 1 wherein said first guide means comprises a rotatable snubber whose peripheral surface contacts one surface of said film and is rotated thereby about a stationary axis as said film is withdrawn from said coil, when the film is intermittently advanced past said exposure aperture.

3. A motion picture film cartridge according to claim 2 wherein a plurality of protuberances are located on the inner wall of said housing adjacent said first guide means and along the path of said film as it moves about said first guide means, said protuberances being positioned for engagement by the outer surface of said film to limit radial outward displacement of said film as it moves about said first guide means.

4. A motion picture film cartridge according to claim 3 wherein said plurality of protuberances comprises a plurality of spaced rib members whose longitudinal axes extend substantially parallel to the axis of said rotatable snubber.

5. A film cartridge according to claim 1 wherein said second guide means includes an edge guide member for slidably engaging one edge of said film to direct said film in canted relation to the plane of rotation of said coil in said supply chamber.

6. A motion picture film cartridge according to claim 1 wherein said second guide means includes a wall member canted with respect to said partition to form one side of a passageway guiding the film over said partition and into alignment with the plane of rotation of said take-up core.

7. A motion picture film cartridge according to claim 1 further including a stationary film snubber located in said film path below said exposure aperture and ahead of said third guide means to engage one surface of said film in leaving said exposure aperture and guide said film towards said third guide means, and fourth guide means located adjacent and spaced from said stationary snubber to slidably contact the opposite surface of said film and direct said film towards said third guide means as the film is intermittently moved past said exposure aperture.

8. A motion picture film cartridge according to claim 7 wherein said fourth guide means is a pair of film guide tracks adjacent the lower front portion of said housing and engaging the marginal portions of that surface of said film opposite that engaged by said snubber.

9. A motion picture film cartridge according to claim 7 including a fifth guide means located adjacent the path of said film as it moves from said stationary snubber towards said third guide means for contacting one surface of said moving film to retain said film in a given path as it moves towards said third guide means.

10. A motion picture film cartridge according to claim 1 in which said third guide means is a stationary snubber about which said film is wrapped to isolate the intermittent motion of that portion of said film at said exposure aperture from the motion imparted to that portion of the film by rotation of said take-up core.

11. A motion picture film cartridge according to claim 10 in which a pair of guide members are located adjacent said stationary snubber for slidably engaging opposite edges of said film to center the film relative to the plane of rotation of said take-up core as said film moves about said stationary snubber.

12. A motion picture film cartridge according to claim 11 wherein one of said last-mentioned guide members is a raised bead located on said partition and extending substantially transversely of that portion of the path of said film defined by said snubber for engaging one edge of said film; and the other of said guide members is an elongated member located on the inner surface of said housing for engaging the opposite edge of said film.

13. In a motion picture film cartridge including a housing having a front wall provided with an exposure aperture across which a film is adapted to be intermittently moved for exposure; a rear wall spaced from and parallel to said front wall; a partition located in said housing substantially perpendicular to the plane of each of said front and rear walls to separate the interior of said housing into a supply chamber and a take-up chamber in side-by-side relation, the take-up chamber being in alignment with said exposure aperture; a take-up core rotatably mounted in said take-up chamber and adapted to be continuously driven to wind film thereupon; a supply coil of film rotatably mounted in said supply chamber in coaxial relation with said take-up core and from which the film is adapted to be pulled by a pull-down claw intermittenlty feeding the film past said exposure aperture and feeding it to said take-up core; the improvement comprising:

(a) rotatable snubber means located in the upper rear portion of said housing behind said coil of film around which the film after being pulled tangentially from the upper side of said coil rearwardly of said housing is doubled back upon itself and directed toward said front wall of said housing; spaced parallel ribs extending from a wall of said supply chamber in substantially parallel spaced relation with said rotatable snubber means to engage the outer surface of said film and limit the outward radial expansion of the loop formed in said film as it is doubled back over said snubber means, (b) means forming a passageway for edge and surface guiding said film from said rotatable snubber means and extending between said rotatable snubber means and said front wall in a path which is canted relative to the plane of rotation of said coil of film and crosses over said partition into alignment with the plane of rotation of said take-up core to feed the film to a point above said exposure aperture, (c) stationary snubber means located in said take-up chamber below and to the rear of said take-up core about which the film leaving said exposure aperture is doubled back upon itself in passing to said take-up core, and (d) guide means adjacent to and spaced from said stationary snubber means for slidably engaging opposite edges of said film to center the film relative to the plane of rotation of said take-up core as said film moves about said stationary snubber means.

References Cited by the Examiner

UNITED STATES PATENTS

| | | | |
|---|---|---|---|
| 1,368,860 | 2/21 | Taifirnopoulos | 352—156 |
| 2,668,021 | 2/54 | Gleason | 242—71.2 X |
| 2,748,650 | 6/56 | Melton | 352—156 |

MERVIN STEIN, *Primary Examiner.*

UNITED STATES PATENT OFFICE
CERTIFICATE OF CORRECTION

Patent No. 3,208,686

September 28, 1965

Evan A. Edwards et al.

It is hereby certified that error appears in the above numbered patent requiring correction and that the said Letters Patent should read as corrected below.

Column 2, line 29, for "patch" read -- path --; line 54, for "1-6" read -- 1-5 --; column 3, line 14, for "trap" read -- tray --; line 40, after "29" insert -- of --; column 4, line 9, for "appaartus" read -- apparatus --; line 39, for "snuber" read -- snubber --; column 8, line 17, for "intermittenlty" read -- intermittently --.

Signed and sealed this 19th day of April 1966.

(SEAL)
Attest:

ERNEST W. SWIDER
Attesting Officer

EDWARD J. BRENNER
Commissioner of Patents